United States Patent
Kawahara et al.

(10) Patent No.: US 11,543,002 B2
(45) Date of Patent: Jan. 3, 2023

(54) POWER TRANSMISSION DEVICE

(71) Applicant: EXEDY Corporation, Neyagawa (JP)

(72) Inventors: Yuki Kawahara, Neyagawa (JP);
Hitoshi Katsura, Neyagawa (JP);
Katsuaki Waki, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 876 days.

(21) Appl. No.: 16/283,127

(22) Filed: Feb. 22, 2019

(65) Prior Publication Data
US 2019/0285121 A1    Sep. 19, 2019

(30) Foreign Application Priority Data
Mar. 19, 2018  (JP) .............................. JP2018-050883

(51) Int. Cl.
*F16F 15/129*   (2006.01)
*F16D 7/02*    (2006.01)

(52) U.S. Cl.
CPC .......... *F16F 15/1297* (2013.01); *F16D 7/028* (2013.01)

(58) Field of Classification Search
CPC .......... F16D 7/024; F16D 7/028; F16D 7/044; F16D 43/2024; F16D 43/218; F16F 15/129; F16F 15/1297; F16F 15/139; F16F 15/1397
USPC ................................ 464/41–47, 68.4, 68.41
See application file for complete search history.

(56) References Cited

U.S. PATENT DOCUMENTS

| | | | | |
|---|---|---|---|---|
| 4,583,959 A | * | 4/1986 | Yoneda | F16F 15/1292 464/68.41 |
| 5,014,842 A | * | 5/1991 | Graton | F16F 15/129 464/68.6 |
| 5,617,938 A | * | 4/1997 | Tsukada | F16D 13/52 192/55.61 |
| 7,357,722 B2 | * | 4/2008 | Kim | F16F 15/129 464/68.4 |

(Continued)

FOREIGN PATENT DOCUMENTS

| | | |
|---|---|---|
| CN | 1129295 A | 8/1996 |
| CN | 1648482 A | 8/2005 |

(Continued)

OTHER PUBLICATIONS

1st Office Action issued in the corresponding Chinese Patent Application No. 201910191706.3, dated Aug. 3, 2022; 6 pages.

*Primary Examiner* — Josh Skroupa
(74) *Attorney, Agent, or Firm* — United IP Counselors, LLC

(57) ABSTRACT

A power transmission device includes an input rotary member, an intermediate rotary member, an output rotary member, a friction engaging part and a load adjusting mechanism. A torque is inputted to the input rotary member. The torque is inputted from the input rotary member to the intermediate rotary member. The torque is outputted from the output rotary member. The friction engaging part is engaged by friction with a friction force depending on a load applied thereto. The friction engaging part is configured to transmit the torque between the intermediate rotary member and the output rotary member. The load adjusting mechanism is configured to adjust the load applied to the friction engaging part in accordance with the torque inputted to the input rotary member.

10 Claims, 5 Drawing Sheets

(56) References Cited

U.S. PATENT DOCUMENTS

| | | | |
|---|---|---|---|
| 8,151,964 B2* | 4/2012 | Suzuta | F16D 13/52 192/54.5 |
| 8,210,950 B2* | 7/2012 | Nakagaito | F16F 15/1397 464/68.41 |
| 8,240,445 B2* | 8/2012 | Gokan | F16D 13/56 192/54.5 |
| 8,267,235 B2 | 9/2012 | Burns et al. | |
| 8,517,843 B2* | 8/2013 | Yamada | F16D 7/025 464/47 |
| 8,968,150 B2* | 3/2015 | Misu | F16F 15/1397 464/68.41 |
| 8,998,728 B2* | 4/2015 | Komuro | F16F 15/1292 464/68.41 |
| 2001/0023803 A1 | 9/2001 | Hattori | |
| 2008/0210049 A1* | 9/2008 | Rohs | F16F 15/139 74/574.3 |
| 2017/0043656 A1* | 2/2017 | Hashimoto | F16H 3/727 |

FOREIGN PATENT DOCUMENTS

| | | | |
|---|---|---|---|
| CN | 104011416 A | 8/2014 | |
| DE | 8718035 U1 * | 11/1992 | F16F 15/139 |
| EP | 0550261 B1 | 6/1996 | |
| FR | 2617934 A1 * | 1/1989 | F16F 15/13171 |
| JP | 05-256329 A | 10/1993 | |
| JP | 08-93786 A | 4/1996 | |
| JP | 2001-343061 A | 12/2001 | |
| JP | 2017-035991 A1 | 2/2017 | |
| WO | WO-2005124186 A1 * | 12/2005 | F16F 15/1397 |

* cited by examiner

US 11,543,002 B2

POWER TRANSMISSION DEVICE

CROSS-REFERENCE TO RELATED APPLICATIONS

This application claims priority to Japanese Patent Application No. 2018-50883, filed Mar. 19, 2018. The contents of that application are incorporated by reference herein in their entirety.

TECHNICAL FIELD

The present disclosure relates to a power transmission device.

BACKGROUND ART

Power transmission devices transmit a torque from a drive source (an engine, a motor, etc.) to a drive wheel side. The power transmission devices include a torque limiting mechanism for blocking transmission of a torque of a predetermined magnitude or greater. For example, a power transmission device described in Japan Laid-open Patent Application Publication No. 2017-035991 includes a torque limiting mechanism disposed between an input shaft and an output shaft. The power transmission device causes the torque limiting mechanism to limit the magnitude of a torque transmitted between a prime mover and a drive wheel.

In the torque limiting mechanism, one friction plate disposed on an output shaft side and another friction plate disposed on an input shaft side are pressed against each other by an urging force of a disc spring. Accordingly, the friction plates are engaged by friction with each other. When the torque of the predetermined magnitude or greater is inputted thereto, the friction plates slip against each other.

In the torque limiting mechanism configured as described above, the torque causing the slip is instable, whereby transmission of the torque of the predetermined magnitude or greater cannot be stably prevented.

BRIEF SUMMARY

It is an object of the present disclosure to provide a power transmission device capable of stably preventing transmission of a torque of a predetermined magnitude or greater.

A power transmission device according to as aspect of the present disclosure includes an input rotary member, an intermediate rotary member, an output rotary member, a friction engaging part and a load adjusting mechanism. The input rotary member is a member to which a torque is inputted. The intermediate rotary member is a member to which the torque is inputted from the input rotary member. The output rotary member is a member from which the torque is outputted. The friction engaging part is engaged by friction with a friction force depending on a load applied thereto. Additionally, the friction engaging part transmits the torque between the intermediate rotary member and the output rotary member. The load adjusting mechanism adjusts the load applied to the friction engaging part in accordance with the torque inputted to the input rotary member.

According to this configuration, the load adjusting mechanism controls the load applied to the friction engaging part. For example, when the inputted torque has a predetermined magnitude or greater, the load adjusting mechanism makes adjustment to reduce the load applied to the friction engaging part. As a result, the friction force is reduced in the friction engaging part, whereby the friction engaging part is not sufficiently engaged by friction. Hence, the torque of the predetermined magnitude or greater is prevented from being transmitted to the output rotary member. Thus, adjustment of the load applied to the friction engaging part makes the friction engaging part slip. Hence, it is possible to stably prevent transmission of the torque of the predetermined magnitude or greater.

Preferably, the load adjusting mechanism reduces the load applied to the friction engaging part when the torque inputted to the input rotary member has a predetermined magnitude or greater.

Preferably, the power transmission device further includes a first elastic member elastically coupling the input rotary member and the intermediate rotary member in a circumferential direction. The load adjusting mechanism adjusts the load applied to the friction engaging part in accordance with a torsion angle between the input rotary member and the intermediate rotary member. Preferably, the load adjusting mechanism reduces the load applied to the friction engaging part when the torsion angle becomes predetermined degrees or greater.

Preferably, the load adjusting mechanism includes a cam mechanism. The cam mechanism reduces the load applied to the friction engaging part when the torsion angle becomes predetermined degrees or greater.

Preferably, the intermediate rotary member is movable in an axial direction. The load adjusting mechanism includes a pressing member. The pressing member presses the intermediate rotary member in the axial direction so as to apply the load to the friction engaging part, and is unitarily rotated with the intermediate rotary member. The cam mechanism moves the pressing member in the axial direction when the torsion angle becomes the predetermined degrees or greater.

Preferably, the load adjusting mechanism further includes a second elastic member disposed between the pressing member and the intermediate rotary member. The pressing member presses the intermediate rotary member through the second elastic member.

Preferably, the friction engaging part includes a first friction plate and a second friction plate. The first friction plate is unitarily rotated with the intermediate rotary member. The second friction plate is unitarily rotated with the output rotary member.

Preferably, the first friction plate and the second friction plate make contact with each other at surfaces thereof each having a conical shape.

Preferably, the first friction plate and the second friction plate make contact with each other at surfaces thereof each extending in a circumferentially wavy shape.

Overall, according to the present disclosure, it is possible to stably prevent transmission of a torque of a predetermined magnitude or greater.

DETAILED DESCRIPTION

A power transmission device according to an embodiment of the present disclosure will be explained with reference to the attached drawings. It should be noted that in the following explanation, the term "axial direction" refers to an extending direction of a rotational axis O of a power transmission device 100. Additionally, the term "circumferential direction" refers to a circumferential direction of an imaginary circle about the rotational axis O. The term "radial direction" refers to a radial direction of the imaginary circle about the rotational axis O.

[Power Transmission Device]

Figure 1:
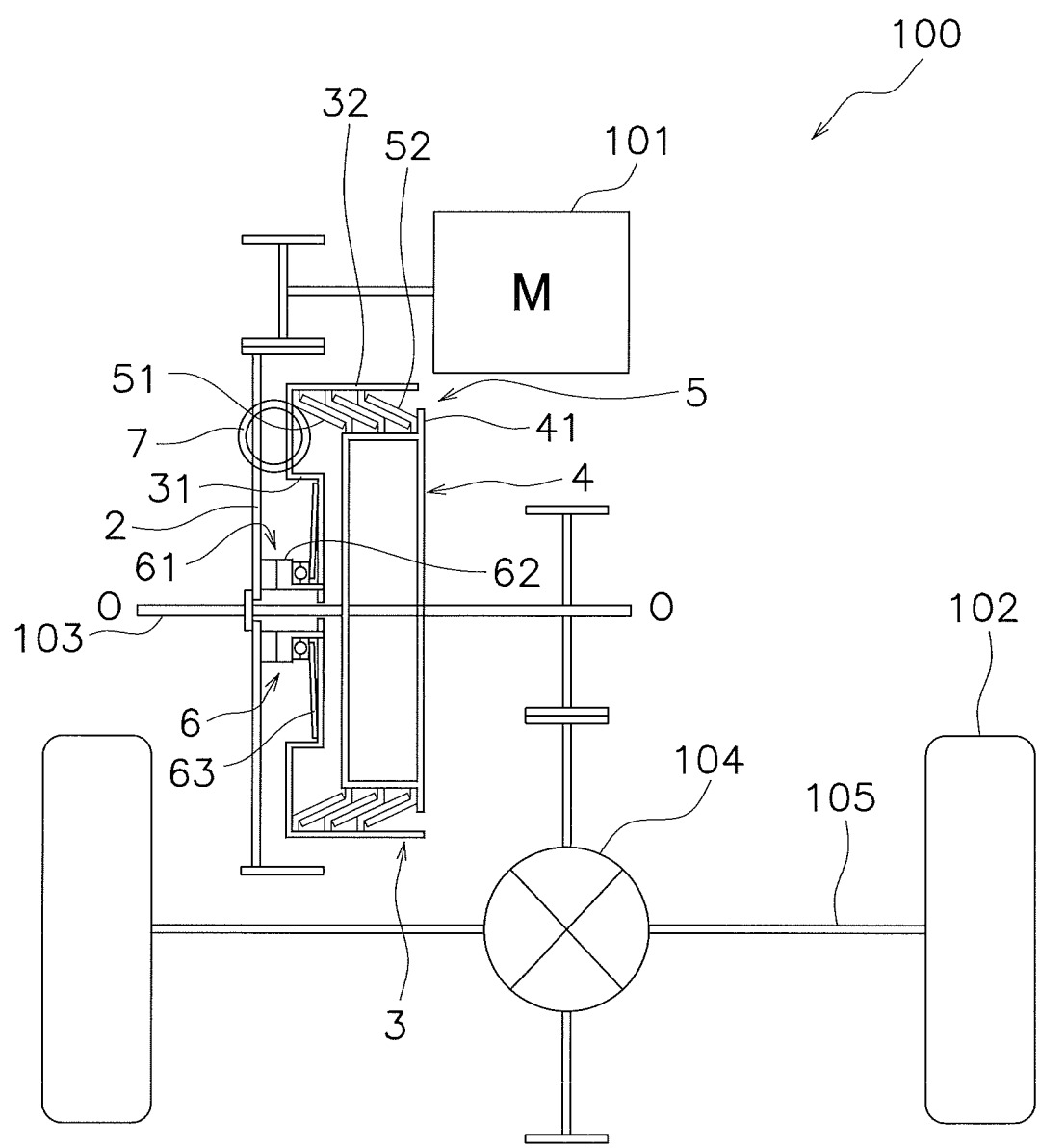
FIG. 1 is a schematic diagram showing a power transmission device.

As shown in FIG. 1, the power transmission device 100 is disposed on a power transmission path between a drive source 101 and drive wheels 102. The power transmission device 100 is configured to transmit a torque between the drive source 101 and the drive wheels 102. However, the power transmission device 100 is configured not to transmit a torque when the torque has a predetermined magnitude or greater. It should be noted that the drive source 101 is, for instance, a motor. When having less than the predetermined magnitude, a torque is transmitted through the power transmission device 100, and is then transmitted to the drive wheels 102 through a differential 104 and a driveshaft 105.

The power transmission device 100 includes an input rotary member 2, an intermediate rotary member 3, an output rotary member 4, a friction engaging part 5, a load adjusting mechanism 6 and at least one first elastic member 7. The power transmission device 100 is configured to be rotated about a shaft member 103. In other words, the rotational axis of the power transmission device 100 extends to substantially overlap with the axis of the shaft member 103.

[Input Rotary Member]

The input rotary member 2 is a member to which a torque is inputted from the drive source 101. For example, the input rotary member 2 includes a gear on the outer peripheral surface thereof. The input rotary member 2 is attached to be rotatable about the shaft member 103. It should be noted that the input rotary member 2 is rotatable relatively to the shaft member 103. Additionally, the input rotary member 2 is immovable in the axial direction.

Figure 2:
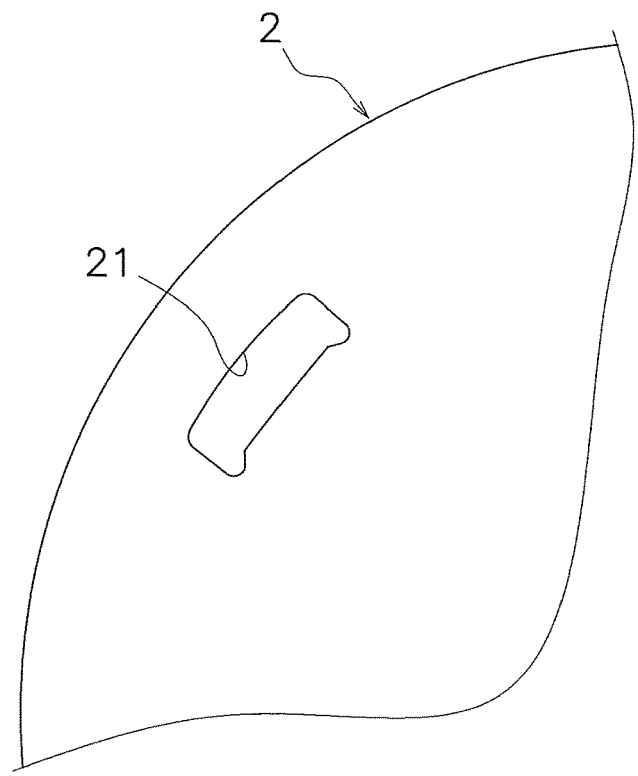
FIG. 2 is an enlarged front view of an input rotary member.

As shown in FIG. 2, the input rotary member 2 has a disc shape. The input rotary member 2 includes at least one first opening 21. Each first opening 21 extends in the circumferential direction.

[Intermediate Rotary Member]

As shown in FIG. 1, the intermediate rotary member 3 is a member to which a torque is inputted from the input rotary member 2. Detailedly, the intermediate rotary member 3 is a member to which the torque is inputted from the input rotary member 2 through the at least one first elastic member 7. The intermediate rotary member 3 is attached to be rotatable about the shaft member 103. The intermediate rotary member 3 is rotatable relatively to the shaft member 103.

The intermediate rotary member 3 is movable in the axial direction. The intermediate rotary member 3 includes a disc portion 31 and a cylindrical portion 32. The disc portion 31 and the cylindrical portion 32 are provided as a single member.

Figure 3:
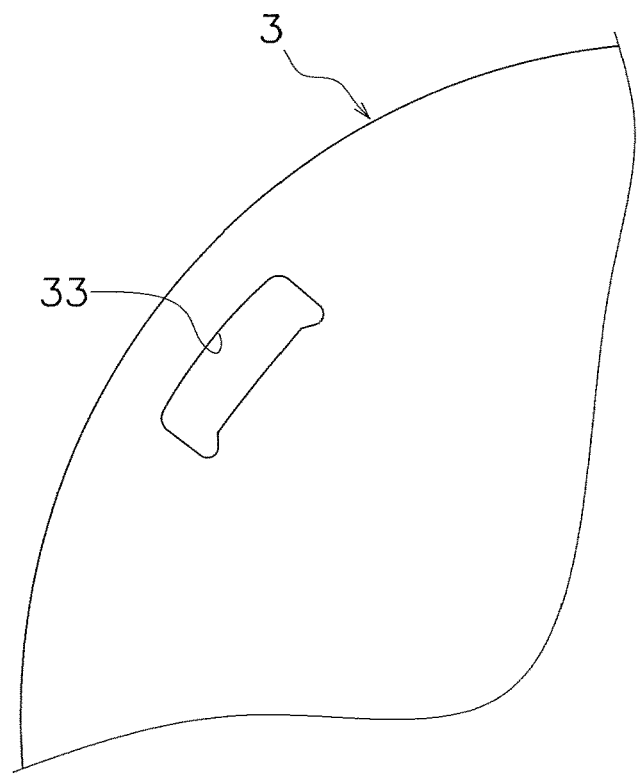
FIG. 3 is an enlarged front view of an intermediate rotary member.

The disc portion 31 is disposed in opposition to the input rotary member 2. As shown in FIG. 3, the disc portion 31 includes at least one second opening 33. As seen in the axial direction, each second opening 33 overlaps with each first opening 21 of the input rotary member 2.

The cylindrical portion 32 extends from the outer peripheral end of the disc portion 31 in the axial direction. Detailedly, the cylindrical portion 32 extends toward the output rotary member 4.

[First Elastic Member]

Figure 4:
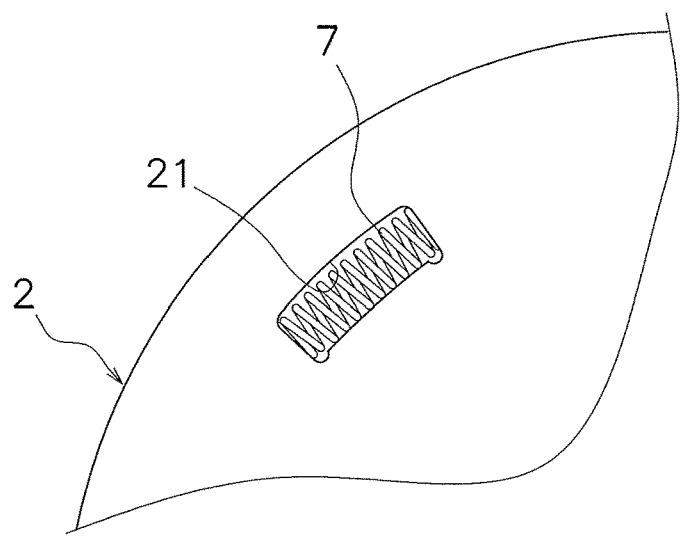
FIG. 4 is an enlarged front view of a first elastic member attached to the input rotary member and the intermediate rotary member.

The at least one first elastic member 7 elastically couples the input rotary member 2 and the intermediate rotary member 3 in the circumferential direction. As shown in FIG. 4, each first elastic member 7 is accommodated in an accommodation part composed of each first opening 21 of the input rotary member 2 and each second opening 33 of the intermediate rotary member 3. In other words, each first elastic member 7 is accommodated in both each first opening 21 and each second opening 33. Each first elastic member 7 is, for instance, a torsion spring. Each first elastic member 7 is disposed to extend in the circumferential direction.

When the input rotary member 2 and the intermediate rotary member 3 are rotated relatively to each other, the at least one first elastic member 7 is compressed. The at least one first elastic member 7 herein compressed urges the input rotary member 2 and the intermediate rotary member 3 so as to make the both members 2 and 3 return to a condition made before occurrence of relative rotation.

[Output Rotary Member]

The output rotary member 4 outputs a torque to the drive wheel 102 side. Detailedly, the output rotary member 4 outputs the torque, transmitted thereto from the intermediate rotary member 3 through the friction engaging part 5, to the drive wheel 102 side. The output rotary member 4 is unitarily rotated with the shaft member 103. Additionally, the output rotary member 4 is immovable in the axial direction. For example, the output rotary member 4 is fixed to the shaft member 103.

The output rotary member 4 has a cylindrical shape. The output rotary member 4 overlaps with the cylindrical portion 32 of the intermediate rotary member 3 as seen in the radial direction. In other words, the output rotary member 4 is disposed radially inside the cylindrical portion 32 of the intermediate rotary member 3.

[Friction Engaging Part]

The friction engaging part 5 is configured to transmit a torque between the intermediate rotary member 3 and the output rotary member 4. The friction engaging part 5 is engaged by friction with a friction force depending on a load applied thereto. Detailedly, an axial load is applied to the friction engaging part 5. Then, the friction engaging part 5 transmits a torque depending on a friction force. For example, the torque transmittable by the friction engaging part 5 is reduced with reduction in friction force. The friction engaging part 5 includes a plurality of first friction plates 51 and a plurality of second friction plates 52.

The first friction plates 51 are unitarily rotated with the intermediate rotary member 3. The first friction plates 51 are attached to the inner peripheral surface of the cylindrical portion 32 of the intermediate rotary member 3 so as to be movable in the axial direction. For example, each first friction plate 51 has a conical shape. Additionally, the outer peripheral ends of the first friction plates 51 are spline-coupled to the inner peripheral surface of the cylindrical portion 32 of the intermediate rotary member 3.

One of the plural first friction plates 51, disposed closest to the disc portion 31 of the intermediate rotary member 3, is pressed in the axial direction by the disc portion 31. As a result of this axial pressing by the disc portion 31, the first friction plates 51 are pressed onto the second friction plates 52, respectively.

The second friction plates 52 are unitarily rotated with the output rotary member 4. The second friction plates 52 are attached to the outer peripheral surface of the output rotary member 4 so as to be movable in the axial direction. For example, each second friction plate 52 has a conical shape. The second friction plates 52 are opposed to the first friction plates 51. The inner peripheral ends of the second friction plates 52 are spline-coupled to the outer peripheral surface of the output rotary member 4.

One of the plural second friction plates 52, disposed furthest from the disc portion 31 of the intermediate rotary member 3, is restricted from moving away from the disc portion 31 in the axial direction by a receiving portion 41 of the output rotary member 4.

When an axial load is applied to the friction engaging part 5 from the intermediate rotary member 3, the first friction plates 51 and the second friction plates 52 are engaged by friction with a friction force depending on the load herein applied. When engaged by friction, the friction engaging part 5 transmits a torque between the intermediate rotary member 3 and the output rotary member 4.

[Load Adjusting Mechanism]

The load adjusting mechanism 6 adjusts a load applied to the friction engaging part 5 in accordance with a torque inputted to the input rotary member 2. For example, when the torque inputted to the input rotary member 2 has the predetermined magnitude or greater, the load adjusting mechanism 6 reduces the load applied to the friction engaging part 5. It should be noted that the load adjusting mechanism 6 handles a torsion angle between the input rotary member 2 and the intermediate rotary member 3 as the torque inputted to the input rotary member 2. Based on this, when the torsion angle becomes predetermined degrees or greater, the load adjusting mechanism 6 reduces the load applied to the friction engaging part 5.

The load adjusting mechanism 6 includes a cam mechanism 61, a pressing member 62 and a second elastic member 63. The load adjusting mechanism 6 presses the intermediate rotary member 3 so as to apply a load to the friction engaging part 5.

The pressing member 62 is disposed axially between the cam mechanism 61 and the intermediate rotary member 3. The pressing member 62 is movable in the axial direction. The pressing member 62 is movable relatively to the intermediate rotary member 3 in the axial direction. In other words, the pressing member 62 is movable in the axial direction so as to separate from and approach to the intermediate rotary member 3. Additionally, the pressing member 62 is unitarily rotated with the intermediate rotary member 3.

The pressing member 62 axially presses the intermediate rotary member 3 through the second elastic member 63. When the pressing member 62 is moved to separate from the intermediate rotary member 3, the pressing force applied to the intermediate rotary member 3 is reduced. Contrarily, when the pressing member 62 is moved to approach to the intermediate rotary member 3, the pressing force applied to the intermediate rotary member 3 is increased. Thus, in accordance with the axial position of the pressing member 62, the pressing force applied to the intermediate rotary member 3 varies, and furthermore, the load acting on the friction engaging part 5 varies as well.

The second elastic member 63 is, for instance, a disc spring. The second elastic member 63 is disposed axially between the pressing member 62 and the intermediate rotary member 3. The second elastic member 63 urges the pressing member 62 and the intermediate rotary member 3 in opposite directions so as to separate the both from each other.

The cam mechanism 61 is configured to reduce the load applied to the friction engaging part 5 when the torsion angle between the input rotary member 2 and the intermediate rotary member 3 becomes predetermined degrees or greater. Detailedly, the cam mechanism 61 converts relative rotation between the input rotary member 2 and the intermediate rotary member 3 into the axial motion of the pressing member 62. When the torsion angle between the input rotary member 2 and the intermediate rotary member 3 becomes the predetermined degrees or greater, the cam mechanism 61 moves the pressing member 62 in the axial direction. In other words, the cam mechanism 61 moves the pressing member 62 to a side separating from the intermediate rotary member 3 in the axial direction.

Figure 5:
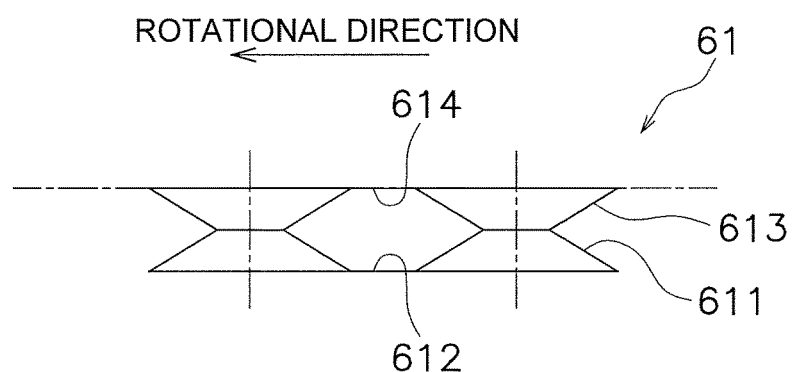
FIG. 5 is a schematic diagram showing a condition of a cam mechanism at a torsion angle of 0 degrees.

As shown in FIG. 5, the cam mechanism 61 includes first protrusions 611, first recesses 612, second protrusions 613 and second recesses 614. The first protrusions 611 protrude to a side approaching to the intermediate rotary member 3 in the axial direction. On the other hand, the second protrusions 613 protrude to a side separating from the intermediate rotary member 3 in the axial direction. Detailedly, each of the first and second protrusions 611 and 613 has lateral surfaces slanting such that the width thereof reduces toward the protruding direction thereof. It should be noted that in each of the first and second protrusions 611 and 613, the lateral surfaces refer to surfaces facing the circumferential direction.

The first protrusions 611 and the first recesses 612 are unitarily rotated with the input rotary member 2. Preferably, the first protrusions 611 and the first recesses 612 are provided on the input rotary member 2. The first protrusions 611 and the first recesses 612 extend in the circumferential direction.

The second protrusions 613 and the second recesses 614 are unitarily rotated with the pressing member 62. Preferably, the second protrusions 613 and the second recesses 614 are provided on the pressing member 62. The second protrusions 613 and the second recesses 614 are opposed to the first protrusions 611 and the first recesses 612.

[Action of Power Transmission Device]

When the input rotary member 2 and the intermediate rotary member 3 are not being rotated relatively to each other, as shown in FIG. 5, the first protrusions 611 and the second protrusions 613 are opposed to each other, whereas the first recesses 612 and the second recesses 614 are opposed to each other.

Figure 6:
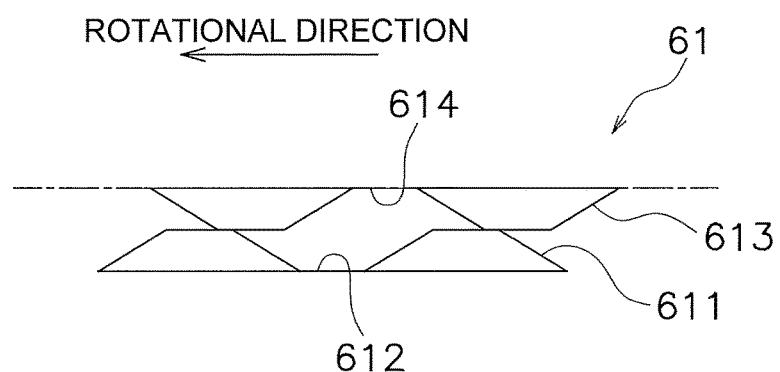
FIG. 6 is a schematic diagram showing a condition of the cam mechanism at a torsion angle of less than predetermined degrees.

Next, when a torque of less than the predetermined magnitude is inputted to the input rotary member 2, the at least one first elastic member 7 is compressed whereby the input rotary member 2 and the intermediate rotary member 3 are rotated relatively to each other. Accordingly, the first protrusions 611 and the second protrusions 613 are circumferentially displaced from each other as shown in FIG. 6. It should be noted that in this phase, the first protrusions 611 and the second protrusions 613 are kept in opposition to each other. Because of this, the first protrusions 611 have not proceeded into the second recesses 614 yet, and likewise, the second protrusions 613 have not proceeded into the first recesses 612 yet. In other words, the axial position of the pressing member 62 has been unchanged, and the load acting on the friction engaging part 5 has been unchanged. Therefore, the torque inputted to the input rotary member 2 is transmitted to the output rotary member 4 through the intermediate rotary member 3 and the friction engaging part 5.

Figure 7:
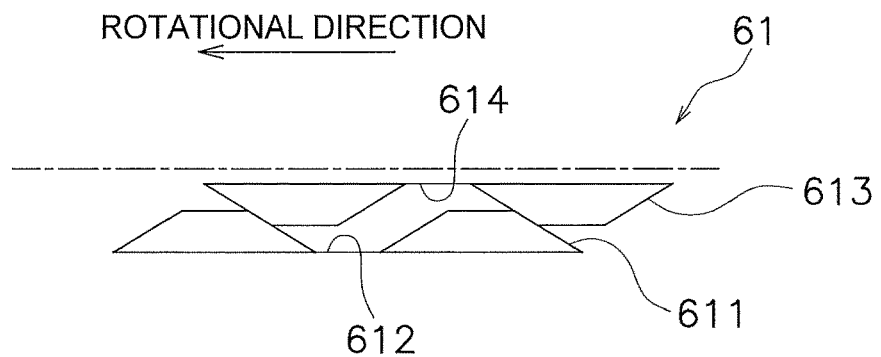
FIG. 7 is a schematic diagram showing a condition of the cam mechanism at a torsion angle of the predetermined degrees or greater.
Figure 8:
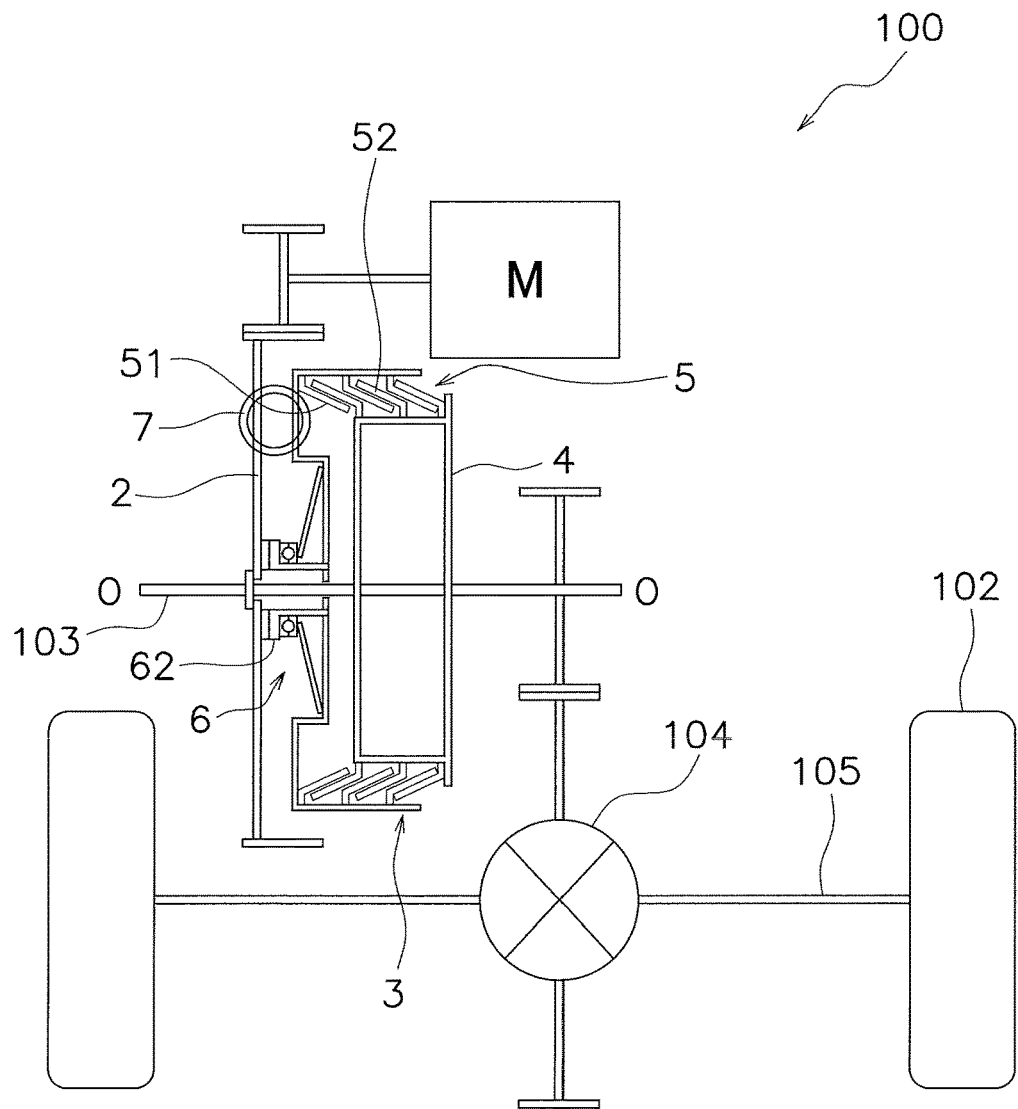
FIG. 8 is a schematic diagram showing a condition of the power transmission device at the torsion angle of predetermined degrees or greater.

Next, when a torque of the predetermined magnitude or greater is inputted to the input rotary member 2, the at least one first elastic member 7 is compressed whereby the torsion angle between the input rotary member 2 and the intermediate rotary member 3 becomes the predetermined degrees or greater. At this time, the first protrusions 611 and the second protrusions 613 are circumferentially displaced from each other as shown in FIG. 7. Besides, the first protrusions 611 are opposed to the second recesses 614, whereas the second protrusions 613 are opposed to the first recesses 612. Because of this, the first protrusions 611 proceed into the second recesses 614, whereas the second protrusions 613 proceed into the first recesses 612. Thus, the pressing member 62 is moved to the side separating from the intermediate rotary member 3 in the axial direction as shown in FIG. 8. As a result, the force applied by the pressing member 62 to press the intermediate rotary member 3 is reduced, and furthermore, the load acting on the friction engaging part 5 is reduced. Thus, the friction force is reduced, whereby the first friction plates 51 and the second friction plates 52 slip against each other. Consequently, the torque of the predetermined magnitude or greater, inputted to the input rotary member 2, is not transmitted to the output rotary member 4 through the friction engaging part 5.

Then, when the torque inputted to the input rotary member 2 is reduced and becomes less than the predetermined magnitude, the torsion angle between the input rotary member 2 and the intermediate rotary member 3 is reduced by the urging force of the at least one first elastic member 7. As a result, the first protrusions 611 and the second protrusions 613 press against each other at the lateral surfaces thereof, and accordingly, are moved in the opposite directions so as to separate from each other. Thus, the first protrusions 611 and the second protrusions 613 return to the condition shown in FIG. 6.

Figure 9:
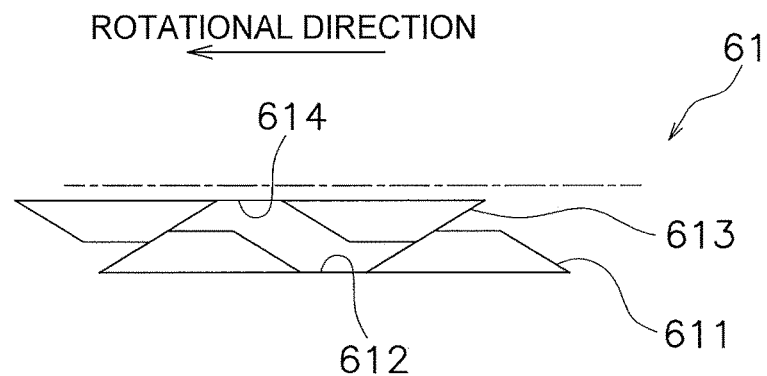
FIG. 9 is a schematic diagram showing a condition of the cam mechanism at the torsion angle of predetermined degrees or greater.

It should be noted that when a torque of the predetermined magnitude or greater is inputted to the power transmission device 100 from the drive wheel 102 side in deceleration or so forth, as shown in FIG. 9, the torsion angle between the input rotary member 2 and the intermediate rotary member 3 becomes the predetermined degrees or greater in the opposite direction to the torsion angle in the condition shown in FIG. 7. Then, the first protrusions 611 and the second protrusions 613 are circumferentially displaced from each other. Besides, the first protrusions 611 are opposed to the second recesses 614, whereas the second protrusions 613 are opposed to the first recesses 612. Because of this, the first protrusions 611 proceed into the second recesses 614, whereas the second protrusions 613 proceed into the first recesses 612. Thus, the pressing member 62 is moved to the side separating from the intermediate rotary member 3 in the axial direction as shown in FIG. 8. As a result, the force applied by the pressing member 62 to press the intermediate rotary member 3 is reduced, and furthermore, the load acting on the friction engaging part 5 is reduced. Then, the friction force is reduced, whereby the first friction plates 51 and the second friction plates 52 slip against each other. Consequently, the torque of the predetermined magnitude or greater, inputted to the output rotary member 4, is not transmitted to the intermediate rotary member 3 through the friction engaging part 5.

[Modifications]

One embodiment of the present disclosure has been explained above. However, the present disclosure is not limited to this, and a variety of changes can be made without departing from the gist of the present disclosure.

Modification 1

The friction engaging part 5 includes the plural first friction plates 51 and the plural second friction plates 52. However, the number of the first friction plates 51 and that of the second friction plates 52 can be both one.

Modification 2

The load adjusting mechanism 6 adjusts the load acting on the friction engaging part 5 in accordance with the torsion angle between the input rotary member 2 and the intermediate rotary member 3. However, the configuration to adjust the load is not limited to this. For example, the load adjusting mechanism 6 can include a torque sensor detecting a torque inputted to the input rotary member 2. Additionally, the load adjusting mechanism 6 can adjust the load acting on the friction engaging part 5 in accordance with the torque detected by the torque sensor.

Modification 3

The load adjusting mechanism 6 includes the pressing member 62 and the second elastic member 63. However, the composition of the load adjusting mechanism 6 is not limited to this. For example, the load adjusting mechanism 6 cannot include the second elastic member 63, and can directly press the intermediate rotary member 3. Alternatively, the pressing member 62 can be integrated with the intermediate rotary member 3.

Modification 4

Figure 10:
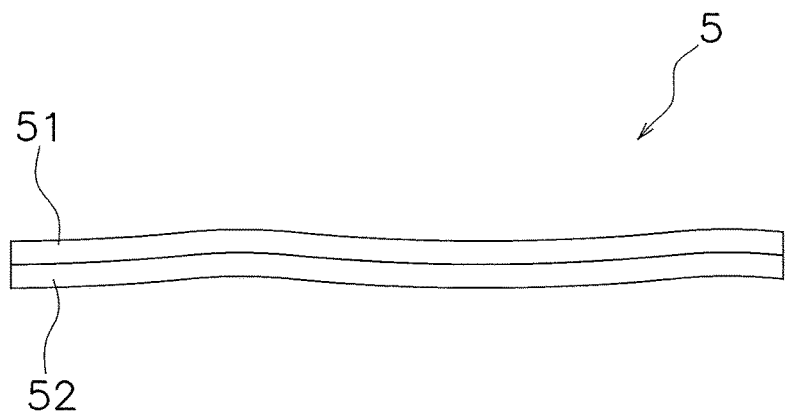
FIG. 10 is a schematic diagram showing a friction engaging part according to a modification.

In the aforementioned embodiment, each of the first and second friction plates 51 and 52 has a conical shape. However, the shape of each of the first and second friction plates 51 and 52 is not limited to this. For example, each of the first and second friction plates 51 and 52 can have a disc shape. Additionally, as shown in FIG. 10, each of the first and second friction plates 51 and 52 can include a friction surface having a wavy shape. In other words, the friction surface of each of the first and second friction plates 51 and 52 can be provided with a repeated pattern of smooth protrusions and recesses along the circumferential direction.

Modification 5

Figure 11:
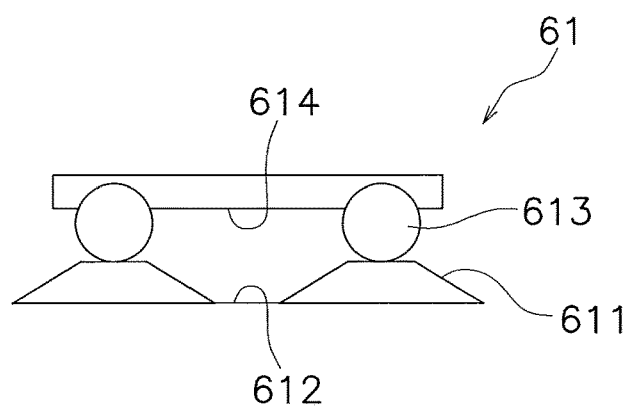
FIG. 11 is a schematic diagram showing a cam mechanism according to another modification.

As shown in FIG. 11, each second protrusion 613 of the cam mechanism 61 can have a roller shape. For example, each second protrusion 613 having a roller shape is rotatably attached to the pressing member 62. It should be noted that each first protrusion 611 can have a roller shape.

Modification 6

In the aforementioned embodiment, a torque of the predetermined magnitude or greater is prevented from being transmitted from both the drive source 101 side and the drive wheel 102 side. However, the configuration to prevent torque transmission is not particularly limited to this. For example, the power transmission device 100 may be capable of preventing transmission of a torque of the predetermined magnitude or greater from the drive source 101 side, but may not be capable of preventing transmission of the torque of the predetermined magnitude or greater from the drive wheel 102 side. Contrarily, the power transmission device 100 may be capable of preventing transmission of the torque of the predetermined magnitude or greater from the drive wheel 102 side, but may not be capable of preventing transmission of the torque of the predetermined magnitude or greater from the drive source 101 side.

REFERENCE SIGNS LIST

2 Input rotary member
3 Intermediate rotary member
4 Output rotary member
5 Friction engaging part
51 First friction plate
52 Second friction plate
6 Load adjusting mechanism
61 Cam mechanism
62 Pressing member
63 Second elastic member
7 First elastic member
100 Power transmission device

What is claimed is:

1. A power transmission device comprising:
   an input rotary member to which a torque is inputted;
   an intermediate rotary member to which the torque is inputted from the input rotary member, the intermediate rotary member being movable in an axial direction;
   an output rotary member from which the torque is outputted;
   a friction engaging part engaged by friction with a friction force depending on a load applied thereto, the friction engaging part configured to transmit the torque between the intermediate rotary member and the output rotary member;
   a load adjusting mechanism configured to adjust the load applied to the friction engaging part in accordance with the torque inputted to the input rotary member, the load adjusting mechanism disposed axially between the input rotary member and the intermediate rotary member; and
   a first elastic member configured to elastically couple the input rotary member and the intermediate rotary member in a circumferential direction,
   the intermediate rotary member being rotatable relative to the input rotary member and the output rotary member.

2. The power transmission device according to claim 1, wherein
   the load adjusting mechanism is further configured to reduce the load applied to the friction engaging part when the torque inputted to the input rotary member has a predetermined magnitude or greater.

3. The power transmission device according to claim 1, wherein
   the load adjusting mechanism is further configured to adjust the load applied to the friction engaging part in accordance with a torsion angle between the input rotary member and the intermediate rotary member.

4. The power transmission device according to claim 3, wherein
   the load adjusting mechanism includes a cam mechanism, the cam mechanism configured to reduce the load applied to the friction engaging part when the torsion angle becomes predetermined degrees or greater.

5. The power transmission device according to claim 4, wherein
   the load adjusting mechanism includes a pressing member, the pressing member configured to press the intermediate rotary member in the axial direction so as to apply the load to the friction engaging part, the pressing member unitarily rotated with the intermediate rotary member, and
   the cam mechanism is configured to move the pressing member in the axial direction when the torsion angle becomes the predetermined degrees or greater.

6. The power transmission device according to claim 5, wherein
   the load adjusting mechanism further includes a second elastic member disposed between the pressing member and the intermediate rotary member, and
   the pressing member is configured to press the intermediate rotary member through the second elastic member.

7. The power transmission device according to claim 1, wherein
   the friction engaging part includes a first friction plate and a second friction plate, the first friction plate unitarily rotated with the intermediate rotary member, the second friction plate unitarily rotated with the output rotary member.

8. The power transmission device according to claim 7, wherein
   the first friction plate and the second friction plate make contact with each other at surfaces thereof each having a conical shape.

9. The power transmission device according to claim 7, wherein
   the first friction plate and the second friction plate make contact with each other at surfaces thereof each extending in a circumferentially wavy shape.

10. A power transmission device comprising:
    an input rotary member to which a torque is inputted;
    an intermediate rotary member to which the torque is inputted from the input rotary member, the intermediate rotary member being movable in an axial direction;
    an output rotary member from which the torque is outputted;
    a friction engaging part engaged by friction with a friction force depending on a load applied thereto, the friction engaging part configured to transmit the torque between the intermediate rotary member and the output rotary member;
    a load adjusting mechanism configured to adjust the load applied to the friction engaging part in accordance with the torque inputted to the input rotary member, the load adjusting mechanism including a cam part formed on the input rotary member; and
    a first elastic member configured to elastically couple the input rotary member and the intermediate rotary member in a circumferential direction,
    the intermediate rotary member being rotatable relative to the input rotary member and the output rotary member.

* * * * *